P. FAIRFIELD.
HOE ATTACHMENT FOR RAKES.
APPLICATION FILED MAR. 8, 1909.
921,968.
Patented May 18, 1909.
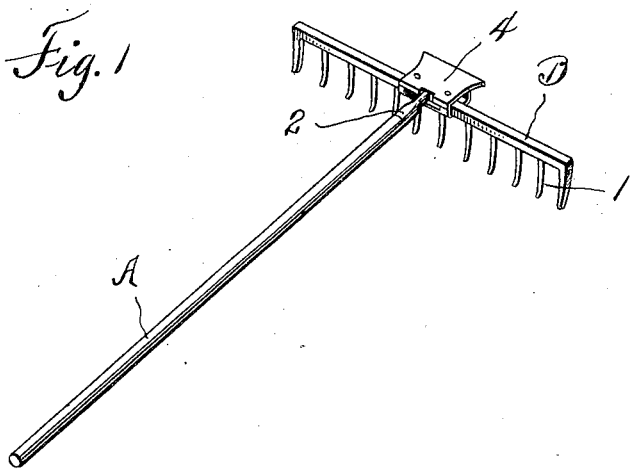
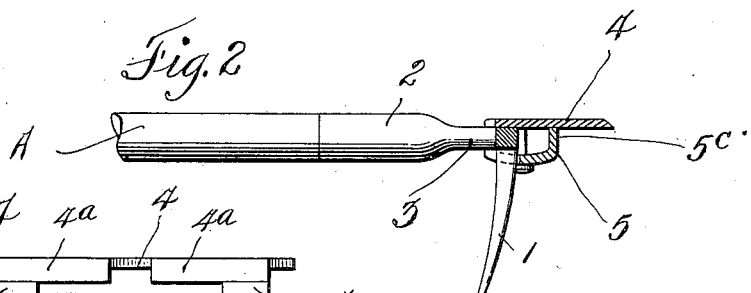
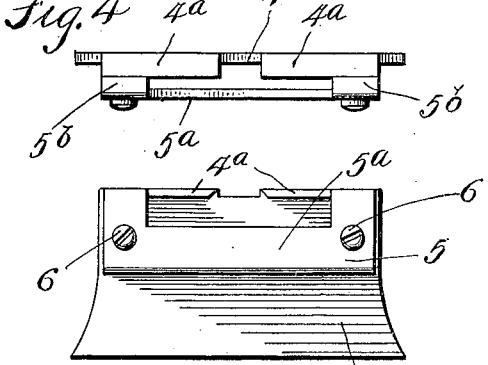
Witnesses
H. M. Brooks
J. E. Dodge
Inventor
P. Fairfield,
By Beeler & Robb
Attorney

UNITED STATES PATENT OFFICE.

PATRICK FAIRFIELD, OF EAST PORT CHESTER, CONNECTICUT.

HOE ATTACHMENT FOR RAKES.

No. 921,968.  Specification of Letters Patent.  Patented May 18, 1909.

Application filed March 8, 1909. Serial No. 482,031.

*To all whom it may concern:*

Be it known that I, PATRICK FAIRFIELD, a citizen of the United States, residing at East Port Chester, in the county of Fairfield and State of Connecticut, have invented certain new and useful Improvements in Hoe Attachments for Rakes, of which the following is a specification.

The present invention consists of a simple and inexpensive attachment for garden rakes.

The main purpose of the invention is to provide a device which when applied to a rake will form a convenient scuffle hoe or edging knife, and which in addition to its function as above noted, will also constitute a means for reinforcing the connection of the tang of the rake to the rake head.

For a full understanding of the invention reference is to be had to the following detail description and to the accompanying drawings, in which—

Figure 1 is a perspective view of an ordinary form of garden rake showing the attachment comprising the invention applied thereto; Fig. 2 is a vertical sectional view bringing out more clearly the manner of clamping the attaching device to the head of the rake; Fig. 3 is a top plan view of the attachment alone; Fig. 4 is a rear end view of the attachment, and Fig. 5 is a bottom plan view of the same.

Throughout the following detail description, and on the several figures of the drawings similar parts are referred to by like reference characters.

Referring particularly to the drawings and describing the detail features of the invention, the letter A denotes the handle of an ordinary garden rake, and the letter B the head thereof. The head of the rake is provided with the usual teeth 1 and has the tang 3 integral therewith and provided with a socket 2 to receive an extremity of the handle A in the customary way.

The invention comprises essentially a blade 4 which is in contact at its under side with the top of the head B of the rake, said blade 4 consisting of a plate which is secured to the head of the rake by means of a clamping member denoted at 5. At its central rear portion the blade 4 is formed with a notch on opposite sides of which are provided lateral flanges 4$^a$. The flanges 4$^a$ are adapted to engage the rear side of the head B of the rake and the edges of said flanges are in contact with the adjacent edges of the flanges 5$^b$ formed upon the clamping member 5. Each member 5 is cut away or recessed as shown at 5$^a$ in order that the handle socket 2 and the tang 3 may not interfere with the attachment of the device to the rake head. The end portions of the clamping member 5 on opposite sides of the recess 5$^a$ extend between certain teeth 1 of the rake head B and when the device is in operative position upon the rake. Clamping screws 6 extend through the clamping member 5 and have the ends thereof screwed into openings in the blade 4, as shown most clearly in Fig. 2 of the drawings. On its outer portion the clamping member 5 is formed with a continuous lateral flange 5$^c$, the upper edge of which is in continuous contact with the under side of the blade 4 at about the middle portion of the latter.

It will be apparent that when the invention is applied to the rake the blade 4 extends from the rake head B at substantially a right angle to the teeth 1. By reason of the peculiar arrangement and form of the parts it will be noted that the device will readily admit of use thereof as a scuffle hoe or edging knife in the manner before premised. The fastenings or screws 6 passing through the clamping member about at a point longitudinally and centrally of its opposite edges provide suitable means for fixedly connecting the attachment to the head B. Furthermore, the attachment not only forms the tools or implements above described, but it reinforces the connection of the tang 3 with the head B of the rake and in this manner performs a function entirely separate from that for which it is mainly provided.

The simplicity of construction of the device will permit of making the same at a very small cost, and it may be applied to any of the general types of garden rakes in present use.

Having thus described the invention, what is claimed as new is:

In combination, a rake embodying a handle and a rake head having teeth projecting therefrom, an attachment comprising a blade having a portion thereof in contact with the top of the head and extending laterally therefrom to form a cutting member or hoe, a clamping member disposed below the head of the rake and having portions thereof passing between the teeth of the said head, said clamping member having edge flanges projecting upwardly and in contact with the blade aforesaid, and fastenings passing through the central portion of the clamping member and connecting the same with the blade so as to firmly clamp said parts to the rake head.

In testimony whereof I affix my signature in presence of two witnesses.

PATRICK FAIRFIELD.

Witnesses:
   HERMAN L. MARSHALL, Jr.,
   JULIA R. REMSEN.